(No Model.) 2 Sheets—Sheet 2.
F. C. WEIR.
MACHINE FOR PULLING COKE FROM OVENS.
No. 362,130. Patented May 3, 1887.
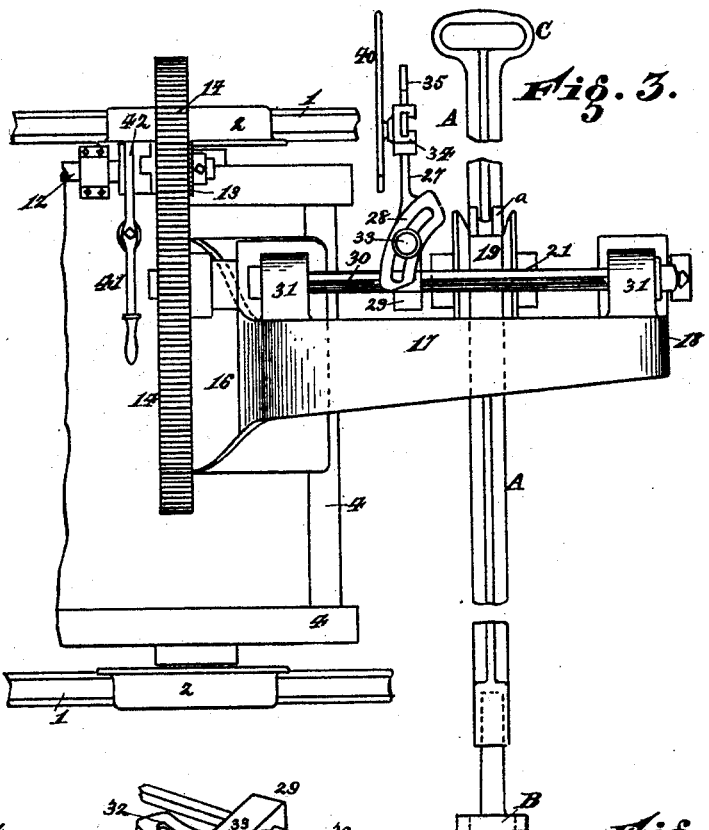
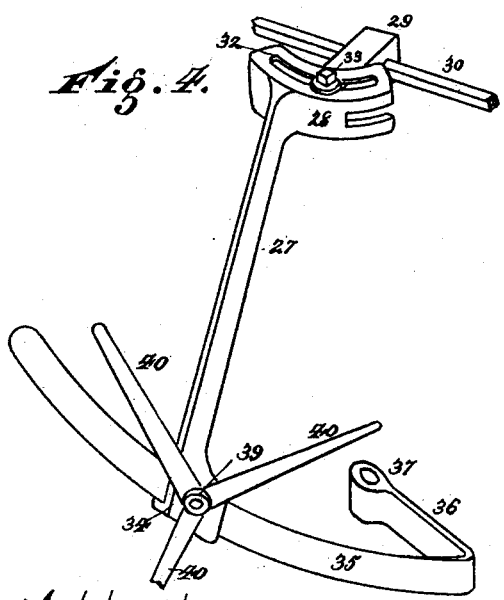
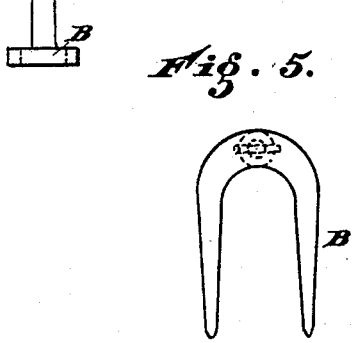
Attest
J. Watson Sims
Jno. S. Roebuck Jr.
Inventor
Frederic C. Weir
By Wood & Boyd
his Attorneys &c.

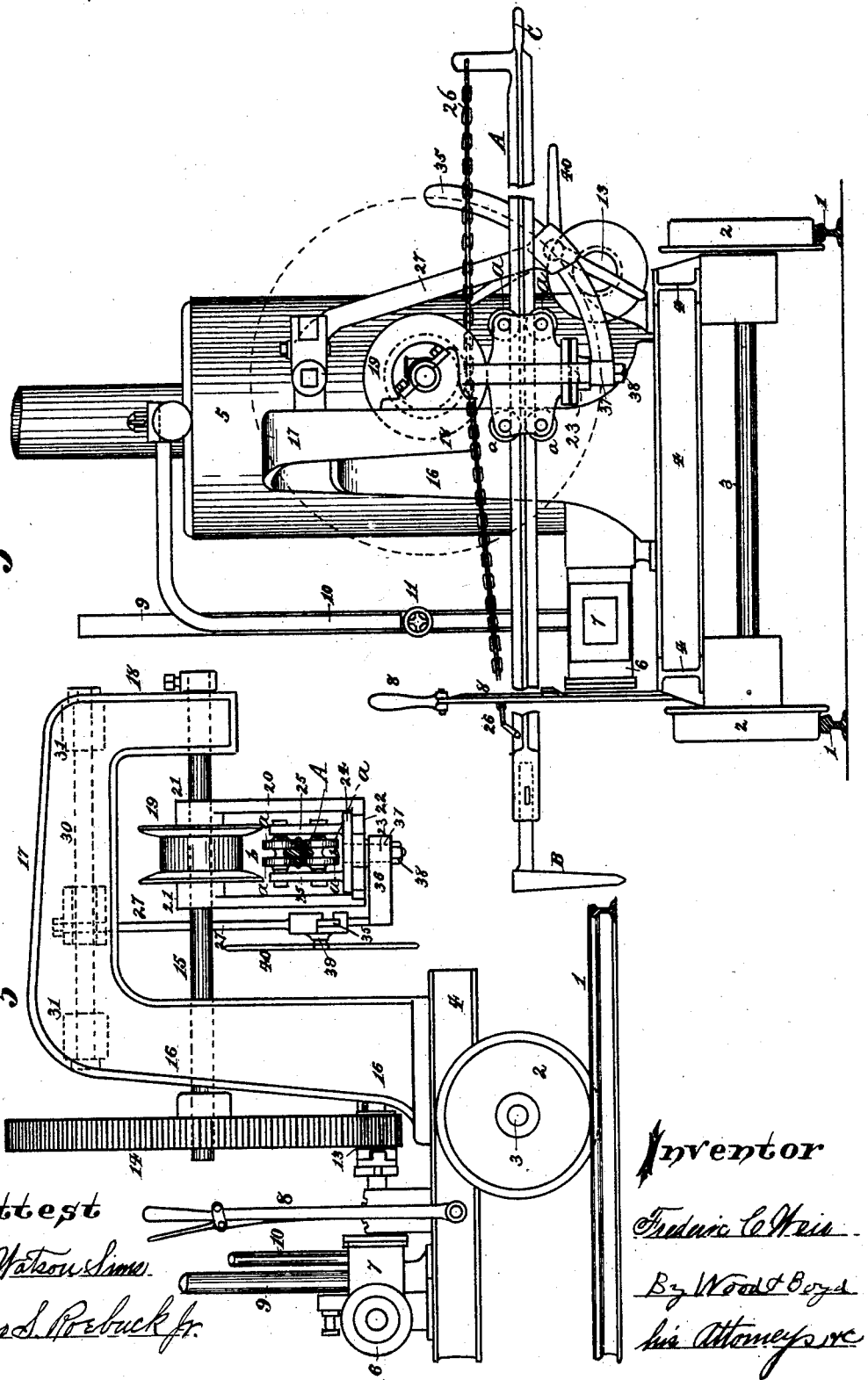

UNITED STATES PATENT OFFICE.

FREDERIC C. WEIR, OF CINCINNATI, OHIO.

MACHINE FOR PULLING COKE FROM OVENS.

SPECIFICATION forming part of Letters Patent No. 362,130, dated May 3, 1887.

Application filed June 28, 1886. Serial No. 206,500. (No model.)

*To all whom it may concern:*

Be it known that I, FREDERIC C. WEIR, a resident of Cincinnati, in the county of Hamilton and State of Ohio, have invented certain new and useful Improvements in Machines for Pulling Coke from Ovens, of which the following is a specification.

My invention relates to a device for drawing coke out of the oven.

It comprises driving devices operated by an engine, preferably mounted upon a car, which can be run up in front of the oven, and a windlass operating a reciprocating arm carrying the pulling-claws, with suitable mechanism for stopping, starting, tilting, and operating the reciprocating claw-arm, all of which will be set forth in the description of the accompanying drawings, making a part of this specification, in which—

Figure 1 is an end elevation of my invention shown mounted upon a car. Fig. 2 is a side elevation of the driving mechanism with the boiler cut off. Fig. 3 is a top plan view of the operating mechanism. Fig. 4 is a detail perspective view of the setting mechanism. Fig. 5 is a plan view of the claws.

1 represents car-tracks; 2, car-wheels running on the same; 3, the car-axle; 4, the frame-pieces of the car.

5 represents the boiler.

6 represents the cylinder of the engine; 7, the steam-chest; 8, the valve-reversing lever; 10, the steam-feed pipe; 9, the exhaust-pipe; 11, the cut-off valve.

12 represents the main shaft driven by the crank and connecting-rod of the engine.

13 represents a driving-gear, mounted on the main shaft, meshing with the driving-transmitter 14, which is mounted on shaft 15.

16 represents the column or the frame-work upon which the operating mechanism is mounted; 17, an overhanging arm; 18, a pendent arm. Shaft 15 is journaled upon bearings attached to column 16 and pendent arm 18.

19 represents a windlass keyed upon shaft 15, which reciprocates the pulling-arm, which is operated by the following devices:

20 represents vibrating hanger-arms provided with bosses 21, which journal upon shaft 15.

22 represents a bridge-tree connecting the lower end of the arms 20 together and serves as a step in which is swiveled a spindle or stud, 23, which projects downward from the base-plate 24. Upon plate 24 are rigidly mounted upright studs 25, in which are journaled four friction-rollers, *a a a a*. These rollers are each provided with a central groove, *b*, and their faces are a sufficient distance asunder to receive a four-winged shaft or arm, A, which rests between and is supported by these rollers. The stud 23 swivels freely in the bridge 22, which allows the rollers and the reciprocating carrying-arm A to be freely moved laterally.

26 represents a carrier-chain wound once around the windlass 19, each end of the chain being connected to an eye near either end of the arm A.

In order that the front end of arm A may be raised and lowered vertically, the pendent arms 20, which support the roller-frame, oscillate or swing on shaft 15. It is desirable to hold the arm A in a given plane with reference to the horizontal lines, in the operation of pulling or reciprocating it backward to draw the coke out of the oven. In order that this plane may be adjustably fixed to any given inclination, I have provided the following instrumentalities:

27 represents a setting-arm. 28 represents a grooved segment cast upon one end; 29, a head sliding on rod 30, which is rigidly secured by bearings 31 at either end of the overhanging arm 17 of the main frame.

32 represents a groove pierced through the flanges of segment 28; 33, a through-bolt, passing through said grooves 32 and through the block 29, by means of which the overhanging arm 27 is rigidly held in any desired position. The groove 32 allows the arm 27 to be swung or moved in a circular path.

34 represents a rectangular-shaped eye in the lower end of said arm 27.

35 represents a segmental arm resting in the eye 34.

36 represents the bent end of segment 35; 37, an eye which swivels upon the lower end of the spindle 23.

38 represents a nut securing the segmental arm 35 in position upon the spindle 23.

39 represents a set-screw tapping through the eye 34, and its point engaging against the segment 35.

40 represents the lever-arms projecting out from set-screw 39, by means of which it is turned to release or secure it.

When the set-screw 39 is slackened, the arm 27 may be moved circularly, swinging the arms 20, carrying the guide-rollers a, and tilting the reciprocating arm A.

In order that the arm A may be adjusted laterally, so as to be moved horizontally across in front of the oven, the pendent arm 18 is a sufficient distance away from the column 16 to allow the pendent arms 20, the adjusting-arm 27, and the mechanism connected thereto, to be slid laterally upon shafts 15 and 30.

The space between the column 16 and pendent arm 18 should correspond to the width of the oven opening, so that the claw and its carrying-arm may be moved to accommodate itself to the charge in the oven which is being drawn.

41 represents a clutch-lever; 42, a clutch on the main shaft 12, by means of which the windlass may be stopped and started by means of lever 41, while the engine is in motion, without changing direction.

In some instances the pulling-arm A may be operated by employing power to pull it backward and stopping the main driving mechanism. The operator may by hand manipulate and set the arm for pulling the coke. When, however, the operator desires to employ the engine for pulling the arm A backward and driving it forward, the operation is as follows: The car carrying the pulling mechanism is set in front of the oven and the pulling mechanism adjusted in front of the oven-opening. One operator opens the valve 11, which starts the engine in motion and drives the windlass 19, winding the chain 26 over it and pulling the claw B either forward or backward, according to the direction in which the windlass is being driven. The set-screw 39 is slackened and the operator grasps the handle C of arm A, when the engine is at rest, and tilts the arms 20, so as to bring the claw B into the desired position for operation. The engine is set in motion with the lever to drive the claw-arm into the oven, and then the claws are dropped into the openings in the coke. The set-screw 39 is then turned up so as to hold the arm A in this plane. The lever 8 is turned to reverse the engine, when windlass 19 is driven in the opposite direction, winding the chain 20 in the reverse direction, which draws the arm A and claws B backward, and with them a portion of the charge of coke. As soon as the claws B have been driven out of the oven the engine is reversed, claws B carried back, and the engine stopped and the arm readjusted if necessary. The motion is reversed and the claws drawn out of the oven in a similar manner.

It will be observed that the arm A may be adjusted laterally by swiveling on the spindle 23, so that it is not necessary to adjust the arm supporting the mechanism laterally on shaft 15 between every reciprocation of the arm A.

I do not wish to limit myself to the details of construction of the engine or other apparatus used to drive power, as these may be variously modified without affecting the principle of the invention herein set forth.

I am aware that heretofore machinery for discharging gas-retorts has comprised a frame movable back and forth in front of the retorts to bring the rakes in coincidence with any bench of retorts as desired, the rake-rods being pivoted to a vertical bar on a reciprocating carriage provided with guide-rollers, whereby it is supported and guided on rails carried by the machine-frame, the front ends of the rake-rods being supported by a vertically-movable adjusting-bar, whereby the rakes are elevated and depressed, a steam-actuated drum being connected by a wire rope or chain with the reciprocating carriage to move the rakes longitudinally, and an automatically-adjustable counter-balance being provided to give a regulated support to the reciprocating rakes during the operation of the machine. I am also aware that in machinery for drawing gas-retorts the rake-rod is sometimes supported between guide-bars, which rock upon a shaft extending from guides that slide up and down the framing of the machine. Compressed air or other power gives motion to a piston provided with a rack which works into a pinion fastened to a sheave or drum, around which is passed a chain that extends from the front end of the rake-rod and passes over one pulley and under another, then around the drum, thence under another pulley at or near the rear end of the rake-rod, and thence to the front end of said rod, where it is fastened, so that movement of the drum in opposite directions will cause the rake to reciprocate accordingly. It will be understood, however, that I do not broadly claim an adjustable rake-rod driven by a windlass and chain. My invention differs from the machines above mentioned in the peculiar construction and combinations of parts set forth in the following claims, and possesses the obvious advantages of affording a convenient adjustment of the claw-arm vertically or horizontally, or to a vertical or lateral inclination, as may be required, and locking the same in any desired position with ease and rapidity.

What I claim as my invention is—

1. In a coke-pulling device, the combination of a windlass and roller supporting frame, guiding the reciprocating arm and oscillating upon a windlass-shaft, with the arm 27 and segment 35 detachably connected, whereby the parts are locked in any desired fixed position, substantially as specified.

2. In a coke-pulling device, in combination with a main frame, the coke-pulling arm mounted upon a vertically-adjusting frame supported by shafts 15 and 30 and laterally adjustable thereon, substantially as specified.

3. The combination of an oscillating and horizontally swiveling frame, rollers journaled in said frame, a four-winged claw-arm supported between said rollers, and a windlass and chain for reciprocating said claw-arm, substantially as described.

4. The combination of the shaft 15, the windlass 19, hanger-arms 20, bridge-tree 22, spindle 23, base-plate 24, studs 25, grooved rollers $a\ a$, four-winged claw-arm A, and chain 26, substantially as described.

5. The combination of the shaft 15, the rod 30, the windlass 19, and oscillating hanger-arms 20, supported on the shaft 15, a laterally swiveled frame supported by the hanger-arms, rollers $a\ a$, journaled in said frame, the claw-arm A, chain 26, setting-arm 27, having grooved segment 28, the sliding head 29, and bolts 33, connecting the grooved segment and rod 30, the arm 35, having a swiveled connection with the roller-carrying frame, and means for adjustably connecting the arms 27 and 35, substantially as described.

In testimony whereof I have hereunto set my hand.

FREDERIC C. WEIR.

Witnesses:
ROBERT ZAHNER,
M. E. MILLIKAN.